(12) United States Patent
Swan et al.

(10) Patent No.: US 12,126,190 B2
(45) Date of Patent: Oct. 22, 2024

(54) OPTIMIZING PAIRING OF A WIRELESS POWER TRANSMISSION SYSTEM WITH A WIRELESS POWER RECEIVER CLIENT

(71) Applicant: OSSIA INC., Redmond, WA (US)

(72) Inventors: Philip L. Swan, Redmond, WA (US); Hatem I. Zeine, Woodinville, WA (US)

(73) Assignee: OSSIA INC., Redmond, WA (US)

( * ) Notice: Subject to any disclaimer, the term of this patent is extended or adjusted under 35 U.S.C. 154(b) by 0 days.

(21) Appl. No.: 18/233,647

(22) Filed: Aug. 14, 2023

(65) Prior Publication Data

US 2023/0387730 A1    Nov. 30, 2023

Related U.S. Application Data

(63) Continuation of application No. 17/340,976, filed on Jun. 7, 2021, now Pat. No. 11,728,693, which is a (Continued)

(51) Int. Cl.
*H02J 50/80* (2016.01)
*H02J 7/00* (2006.01)
*H02J 7/04* (2006.01)
*H02J 50/20* (2016.01)
*H02J 50/40* (2016.01)
*H02J 50/90* (2016.01)

(52) U.S. Cl.
CPC .......... *H02J 50/80* (2016.02); *H02J 7/00045* (2020.01); *H02J 7/04* (2013.01); *H02J 50/20* (2016.02); *H02J 50/40* (2016.02); *H02J 50/90* (2016.02)

(58) Field of Classification Search
CPC ....................................................... H02J 7/80
USPC .............................................................. 320/107
See application file for complete search history.

(56) References Cited

U.S. PATENT DOCUMENTS 6,211,678 B1\* 4/2001 Hagiwara ................ G01V 3/30
                                                                 702/7
9,853,458 B1   12/2017 Bell et al.
(Continued)

FOREIGN PATENT DOCUMENTS

CN           102122846 B      4/2013
CN           106981900 B      2/2020
(Continued)

OTHER PUBLICATIONS

Samuel A. Rotenberg et al., An Efficient Rectifier for an RDA Wireless Power Transmission System Operating at 2.4GHz, (32nd URSI GASS) Aug. 19-26, 2017, Montreal, Canada.
(Continued)

*Primary Examiner* — Jerry D Robbins
(74) *Attorney, Agent, or Firm* — Volpe Koenig

(57) ABSTRACT

Described herein are embodiments of apparatuses and methods for optimizing pairing of a wireless power transmission system (WPTS) with a wireless power receiver client (WPRC) in a localized system. A current WPTS-WPRC pairing and at least one alternate WPTS-WPRC pairing are assessed and the WPTS-WPRC pairing is updated based on associated pairing quality metrics. In this way, a system of many WPTSs and WPRCs will approach an Epsilon equilibrium such that no WPRC would be significantly better served by being paired with a different WPTS.

20 Claims, 10 Drawing Sheets

Related U.S. Application Data continuation of application No. 16/251,160, filed on Jan. 18, 2019, now Pat. No. 11,031,827.

(56) References Cited

U.S. PATENT DOCUMENTS

| | | | |
|---|---|---|---|
| 10,601,251 B2 | 3/2020 | Keith et al. | |
| 2010/0315045 A1* | 12/2010 | Zeine | H02J 50/402 |
| | | | 320/137 |
| 2012/0326658 A1* | 12/2012 | Kim | H02J 50/80 |
| | | | 320/155 |
| 2012/0326660 A1* | 12/2012 | Lu | H02J 50/20 |
| | | | 320/108 |
| 2013/0328417 A1 | 12/2013 | Takeuchi | |
| 2014/0321307 A1* | 10/2014 | Haghighat | H04W 24/10 |
| | | | 370/252 |
| 2016/0297314 A1 | 10/2016 | Iwai et al. | |
| 2017/0005520 A1 | 1/2017 | Zeine et al. | |
| 2017/0149294 A1* | 5/2017 | Wight | H02J 50/20 |
| 2017/0331331 A1 | 11/2017 | Zeine et al. | |
| 2018/0241255 A1 | 8/2018 | Leabman | |
| 2018/0248399 A1 | 8/2018 | Moghaddam et al. | |
| 2018/0248411 A1 | 8/2018 | Sagi et al. | |
| 2018/0331805 A1* | 11/2018 | Xia | H04B 7/088 |
| 2019/0140487 A1 | 5/2019 | Zeine et al. | |
| 2019/0312619 A1* | 10/2019 | Abedini | H04B 7/0695 |
| 2020/0204242 A1* | 6/2020 | Zhou | H04L 25/0226 |
| 2020/0235614 A1 | 7/2020 | Swan et al. | |

FOREIGN PATENT DOCUMENTS

| | | |
|---|---|---|
| JP | 2008283791 A | 11/2008 |
| JP | 2018098770 A | 6/2018 |
| WO | 2017/004335 | 1/2017 |

OTHER PUBLICATIONS

U.S. Appl. No. 15/852,348, filed Dec. 2017, Zeine et al.

* cited by examiner

OPTIMIZING PAIRING OF A WIRELESS POWER TRANSMISSION SYSTEM WITH A WIRELESS POWER RECEIVER CLIENT

CROSS REFERENCE TO RELATED APPLICATION

This application is a continuation of U.S. patent application Ser. No. 17/340,976 filed Jun. 7, 2021, which is a continuation of U.S. patent application Ser. No. 16/251,160, filed Jan. 18, 2019, which issued as U.S. Pat. No. 11,031,827, on Jun. 8, 2021, which is incorporated by reference as if fully set forth.

FIELD OF INVENTION

The embodiments described herein are improvements in the coordination of multiple wireless power transmission systems used for wireless power delivery.

BACKGROUND

There is a need to optimally pair wireless power transmission systems (WPTSs) with wireless power receive clients (WPRCs). A pairing quality metric associated with a certain WPTS-WPRC pairing is needed to be evaluated against another pairing quality metric associated with a different WPTS-WPRC pairing. Ultimately, it must be decided how to optimally pair the WPTSs and WPRCs based on the pairing quality metrics. A need exists for a pairing quality metric analyzer (PQMA), which may exist in a WPTS, a WPRC, or in another entity, to analyze potential pairings and to establish, end, or change pairings to optimize a localized system of WPTSs and WPRCs within a larger system of WPTSs and WPRCs.

SUMMARY

Described herein are embodiments of a wireless power receiver client (WPRC), a wireless power transmission system (WPTS), or another entity such as a server, that may include or may be configured to act as a pairing quality metric analyzer (PQMA). In some embodiments, the WPRC may include a processor that may be configured to determine a first pairing quality metric associated with a first pairing with a first WPTS of a localized system. The processor may be further configured to determine a second pairing quality metric associated with a second pairing with a second WPTS of the localized system. The processor may be further configured to select one of the first WPTS or the second WPTS based on the first pairing quality metric and the second pairing quality metric, wherein the first pairing quality metric and the second pairing quality metric are based on position and orientation information of the WPRC. The WPRC may further include a receiver that may be configured to receive wireless power from the selected one of the first WPTS or the second WPTS.

In one embodiment, the processor may be further configured to determine the first pairing quality metric based on a power need of the WPRC.

In another embodiment, the processor may be further configured to determine the first pairing quality metric based on position and orientation information of the first WPTS.

In yet another embodiment, the processor may be further configured to determine the first pairing quality metric based on information indicating how WPTSs of the localized system are paired with WPRCs.

In yet another embodiment, the processor may be further configured to determine an updated pairing quality metric on a condition that an event has occurred. The event may include a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

In yet another embodiment, a WPRC may include a transceiver that may be configured to receive an indication of a first WPTS or a second WPTS with which to pair, wherein the indication is based on a first pairing quality metric associated with a first pairing with the first WPTS of a localized system and at least a second pairing quality metric associated with a second pairing with the second WPTS of the localized system, and further wherein the first pairing quality metric and the second pairing quality metric are based on position and orientation information of the WPRC. The WPRC may further include a receiver that may be configured to receive wireless power from the first WPTS or the second WPTS based on the indication.

In yet another embodiment, the first pairing quality metric may be based on a power need of the WPRC. Additionally or alternatively, the first pairing quality metric may be based on position and orientation information of the first WPTS. Additionally or alternatively, the first pairing quality metric may be based on information indicating how WPTSs of the localized system are paired with WPRCs.

In yet another embodiment, the transceiver may be further configured to receive an updated indication on a condition that an event has occurred. The event may include a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

In yet another embodiment, a WPTS may include or may be configured to act as a PQMA. The WPTS may include a processor that may be configured to determine a first pairing quality metric associated with a first pairing with a WPRC of a localized system. The WPTS may further include a transceiver that may be configured to receive a second pairing quality metric associated with a second pairing of a second WPTS with the WPRC of the localized system. The processor may be further configured to select one of the WPTS or the second WPTS based on the first pairing quality metric and the second pairing quality metric, wherein the first pairing quality metric and the second pairing quality metric are based on position and orientation information of the WPRC. The WPTS may further include a transmitter that may be configured to transmit wireless power to the WPRC on a condition that the WPTS is selected.

In yet another embodiment, the processor may be further configured to determine the first pairing quality metric based on a power need of the WPRC.

In yet another embodiment, the processor may be further configured to determine the first pairing quality metric based on position and orientation information of the WPTS.

In yet another embodiment, the processor may be further configured to determine the first pairing quality metric based on information indicating how WPTSs of the localized system are paired with WPRCs.

In yet another embodiment, the processor may be further configured to determine an updated pairing quality metric on a condition that an event has occurred. The event may include a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

In yet another embodiment, a WPRC may include a transceiver that may be configured to receive an indication of a first WPTS or a second WPTS with which to pair, wherein the indication is based on a first pairing quality metric associated with a first pairing with the first WPTS of a localized system and at least a second pairing quality metric associated with a second pairing with the second WPTS of the localized system, and further wherein the first pairing quality metric and the second pairing quality metric are based on position and orientation information of the WPRC. The WPTS may further include a receiver that may be configured to receive wireless power from the first WPTS or the second WPTS based on the indication.

As described above, the first pairing quality metric may be based on a power need of the WPRC. Additionally or alternatively, the first pairing quality metric may be based on position and orientation information of the first WPTS. Additionally or alternatively, the first pairing quality metric may be based on information indicating how WPTSs of the localized system are paired with WPRCs.

In yet another embodiment, the transceiver may be further configured to receive an updated indication on a condition that an event has occurred. The event may include a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

DETAILED DESCRIPTION OF THE PREFERRED EMBODIMENTS

Figure 1:
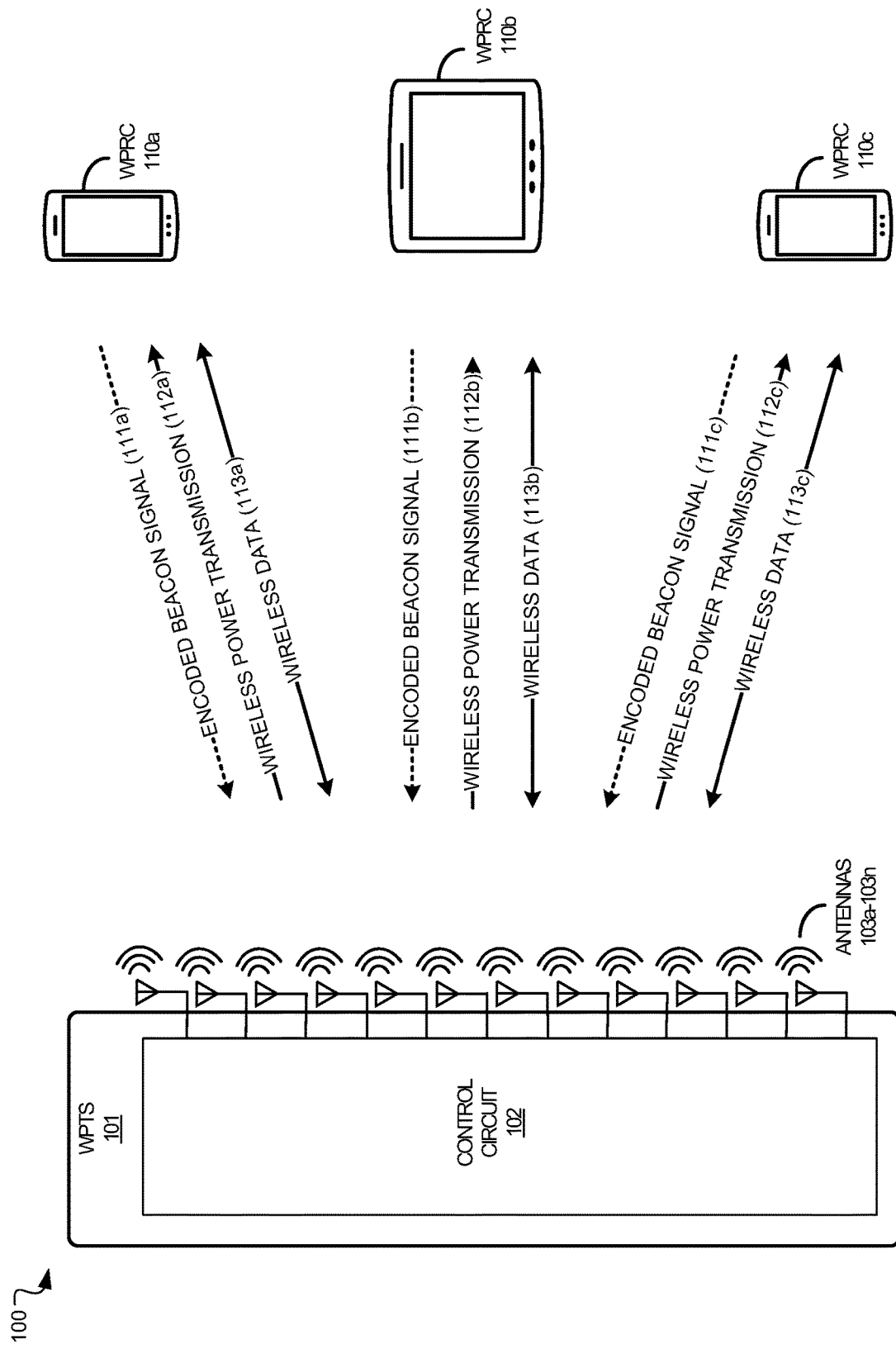
FIG. 1 depicts a system diagram including an example wireless power transmission environment.

FIG. 1 depicts a system diagram including an example wireless power transmission environment 100 illustrating wireless power delivery from one or more wireless power transmission systems (WPTSs), such as WPTS 101. More specifically, FIG. 1 illustrates power transmission to one or more wireless power receiver clients (WPRCs) 110a-110c. WPTS 101 may be configured to receive encoded beacons 111a-111c from WPRCs 110a-110c and transmit wireless power 112a-112c to WPRCs 110a-110c. Wireless data 113a-113c may also be bidirectionally exchanged between WPTS 101 and WPRCs 110a-110c. WPRCs 110a-110c may be configured to receive and process wireless power 112a-112c and wireless data 113a-113c from one or more WPTSs, such as WPTS 101. Components of an example WPTS 101 are shown and discussed in greater detail below, as well as in FIG. 2. Components of an example WPRC 110a-110c are shown and discussed in greater detail with reference to FIG. 3.

WPTS 101 may include multiple antennas 103a-103n, e.g., an antenna array including a plurality of antennas, which may be capable of delivering wireless power 112a-112c to WPRCs 110a-110c. Antennas 103a-103n may further include one or more timing acquisition antennas and one or more communication antennas. In some embodiments, the same antennas for transmission of wireless power may be used for timing acquisition and wireless data communication. In alternative embodiments, separate antennas may be used for wireless power, for timing acquisition, and for wireless data communication. In some embodiments, the antennas are adaptively-phased radio frequency (RF) antennas. The WPTS 101 may be capable of determining the appropriate phases with which to deliver a coherent power transmission signal to WPRCs 110a-110c. Each antenna of the antenna array including antennas 103a-103n may be configured to emit a signal, e.g. a continuous wave or pulsed power transmission signal, at a specific phase relative to each other antenna, such that a coherent sum of the signals transmitted from a collection of the antennas is focused at a location of a respective WPRC 110a-110c. Any number of antennas may be employed in the reception and transmission of signals depicted in FIG. 1. Multiple antennas, including a portion of antennas 103a-103n that may include all of antennas 103a-103n, may be employed in the transmission and/or reception of wireless signals. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital circuits and modems.

As illustrated in the example of FIG. 1, antennas 103a-103n may be included in WPTS 101 and may be configured to transmit both power and data and to receive data. The antennas 103a-103n may be configured to provide delivery of wireless radio frequency power in a wireless power transmission environment 100, to provide data transmission, and to receive wireless data transmitted by WPRCs 110a-110c, including encoded beacon signals 111a-111c. In some embodiments, the data transmission may be through lower power signaling than the wireless radio frequency power transmission. In some embodiments, one or more of the antennas 103a-103n may be alternatively configured for data communications in lieu of wireless power delivery. In some embodiments, one or more of the power delivery antennas 103a-103n can alternatively or additionally be configured for data communications in addition to or in lieu of wireless power delivery. The one or more data communication antennas are configured to send data communications to and receive data communications from WPRCs 110a-110c.

Each of WPRCs 110a-110c may include one or more antennas (not shown) for transmitting signals to and receiving signals from WPTS 101. Likewise, WPTS 101 may include an antenna array having one or more antennas and/or sets of antennas, each antenna or set of antennas being capable of emitting continuous wave or discrete (pulse) signals at specific phases relative to each other antenna or set of antennas. As discussed above, WPTSs 101 is capable of determining the appropriate phases for delivering the coherent signals to the antennas 103a-103n. For example, in some embodiments, delivering coherent signals to a particular WPRC can be determined by computing the complex conjugate of a received encoded beacon signal at each antenna of the array or each antenna of a portion of the array such that a signal from each antenna is phased appropriately relative to a signal from other antennas employed in delivering power or data to the particular WPRC that transmitted the beacon signal. The WPTS 101 can be configured to emit a signal (e.g., continuous wave or pulsed transmission signal) from multiple antennas using multiple waveguides at a specific phase relative to each other. Other techniques for delivering a coherent wireless power signal are also applicable such as, for example, the techniques discussed in U.S. patent application Ser. No. 15/852,216 titled "Anytime Beaconing In A WPTS" filed Dec. 22, 2017 and in U.S. patent application Ser. No. 15/852,348 titled "Transmission Path Identification based on Propagation Channel Diversity" filed Dec. 22, 2017; which are expressly incorporated by reference herein.

Although not illustrated, each component of the wireless power transmission environment 100, e.g., WPRCs 110a-110c, WPTS 101, can include control and synchronization mechanisms, e.g., a data communication synchronization module. WPTS 101 can be connected to a power source such as, for example, a power outlet or source connecting the WPTSs to a standard or primary alternating current (AC) power supply in a building. Alternatively, or additionally, WPTS 101 can be powered by a battery or via other mechanisms, e.g., solar cells, etc.

As shown in the example of FIG. 1, WPRCs 110a-110c include mobile phone devices and a wireless tablet. However, WPRCs 110a-110c can be any device or system that needs power and is capable of receiving wireless power via one or more integrated WPRCs. Although three WPRCs 110a-110c are depicted, any number of WPRCs may be supported. As discussed herein, a WPRC may include one or more integrated power receivers configured to receive and process power from one or more WPTSs and provide the power to the WPRCs 110a-110c or to internal batteries of the WPRCs 110a-110c for operation thereof.

As described herein, each of the WPRCs 110a-110c can be any system and/or device, and/or any combination of devices/systems that can establish a connection with another device, a server and/or other systems within the example wireless power transmission environment 100. In some embodiments, the WPRCs 110a-110c may each include displays or other output functionalities to present or transmit data to a user and/or input functionalities to receive data from the user. By way of example, WPRC 110a can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, WPRC 110a can also be any wearable device such as watches, necklaces, rings or even devices embedded on or within the customer. Other examples of WPRC 110a include, but are not limited to, a safety sensor, e.g. a fire or carbon monoxide sensor, an electric toothbrush, an electronic door lock/handle, an electric light switch controller, an electric shaver, an electronic shelf label (ESL), etc.

Although not illustrated in the example of FIG. 1, the WPTS 101 and the WPRCs 110a-110c can each include a data communication module for communication via a data channel. Alternatively, or additionally, the WPRCs 110a-110c can direct antennas to communicate with WPTS 101 via existing data communications modules. In some embodiments, the WPTS 101 can have an embedded Wi-Fi hub for data communications via one or more antennas or transceivers. In some embodiments, the antennas 103a-103n can communicate via Bluetooth™, Wi-Fi™, ZigBee™, etc. The WPRCs 110a-110c may also include an embedded Bluetooth™, Wi-Fi™, ZigBee™, etc. transceiver for communicating with the WPTS 101. Other data communication protocols are also possible. In some embodiments the beacon signal, which is primarily referred to herein as a continuous waveform, can alternatively or additionally take the form of a modulated signal and/or a discrete/pulsed signal.

WPTS 101 may also include control circuit 102. Control circuit 102 may be configured to provide control and intelligence to the WPTS 101 components. Control circuit 102 may comprise one or more processors, memory units, etc., and may direct and control the various data and power communications. Control circuit 102 may direct data communications on a data carrier frequency that may be the same or different than the frequency via which wireless power is delivered. Likewise, control circuit 102 can direct wireless transmission system 100 to communicate with WPRCs 110a-110c as discussed herein. The data communications can be, by way of example and not limitation, Bluetooth™, Wi-Fi™, ZigBee™, etc. Other communication protocols are possible.

It is appreciated that the use of the term "WPTS" does not necessarily limit the WPTS to any specific structure. That is, the WPTS does not need to be structured in a specific form or geometry. Furthermore, as used herein the term "transmission system" or "WPTS" may be used to include related and peripheral circuitry for signal generation, reception and transmission, such as radios, digital circuits and modems.

Figure 2:
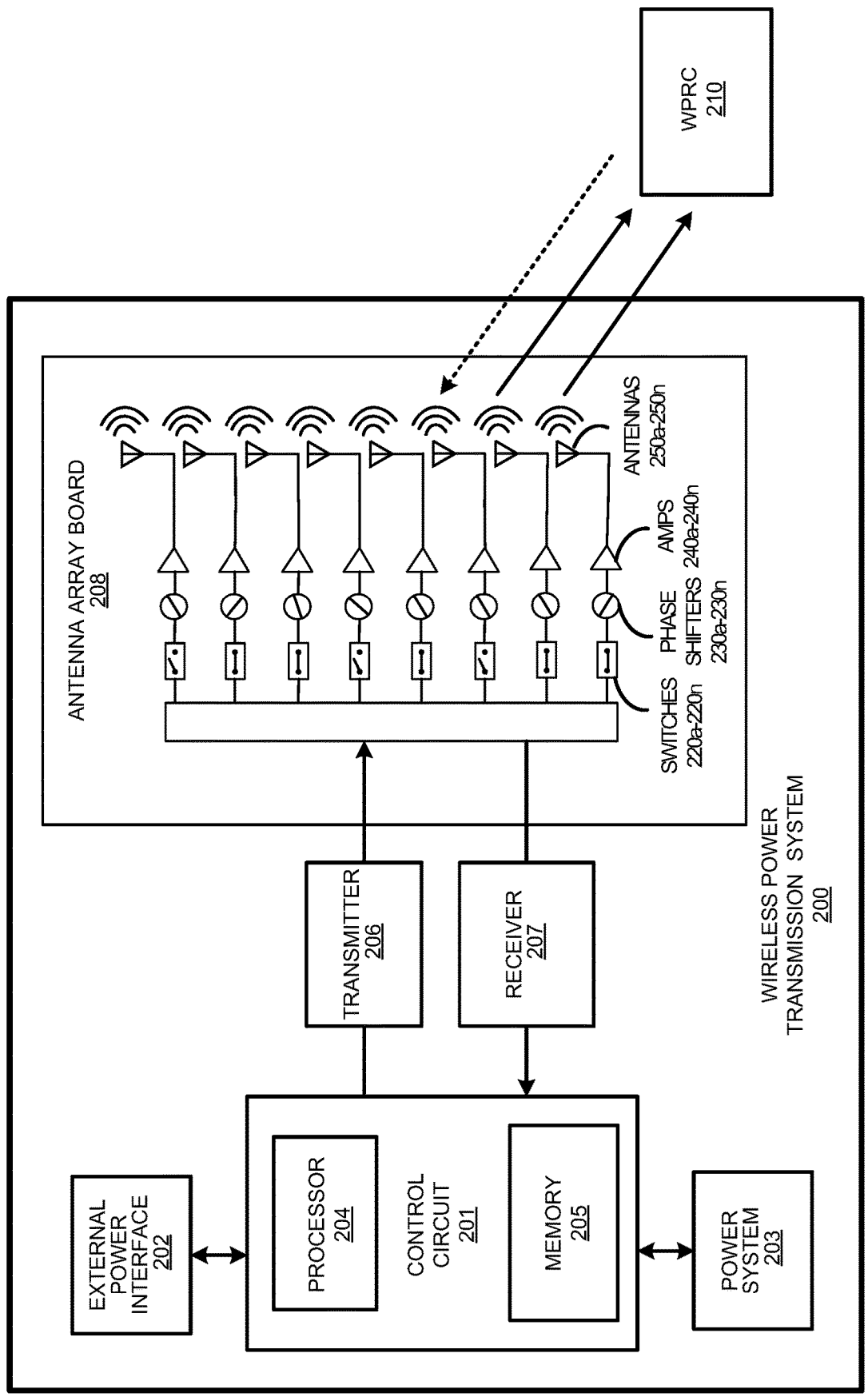
FIG. 2 is a block diagram illustrating example components of an example embodiment of a wireless power transmission system (WPTS).

FIG. 2 is a block diagram illustrating example components of a WPTS 200 in accordance with the embodiments described herein. As illustrated in the example of FIG. 2, the WPTS 200 may include a control circuit 201, external power interface 202, and power system 203. Control circuit 201 may include processor 204, for example a base band processor, and memory 205. Additionally, although only one antenna array board 208 and one transmitter 206 are depicted in FIG. 2, WPTS 200 may include one or more transmitters 206 coupled to one or more antenna array boards 208 and transmit signals to the one or more antenna array boards 208. Although only one receiver is depicted in FIG. 2, one or more receivers 207 may be coupled to the one or more antenna array boards 208 and may receive signals from the one or more antennas 250a-250n of the one or more antenna array boards 208. Each antenna array board 208 includes switches 220a-220n, phase shifters 230a-230n, power amplifiers 240a-240n, and antenna arrays 250a-250n. Although each switch, phase shifter, power amplifier, and antenna is depicted in a one-to-one relationship, this should not be construed as limiting. Additionally or alternatively, any number of switches, phase shifters, power amplifiers, and antennas may be coupled. Some or all of the components of the WPTS 200 can be omitted, combined, or sub-divided in some embodiments. Furthermore, the setting of the switches 220a-220n and phase shifters 230a-230n should not be construed as limiting. Any of the switches 220a-220n, phase shifters 230a-230n, and/or power amplifiers 240a-240n, or any combination thereof, may be individually controlled or controlled in groups. The signals transmitted and received by the one or more antenna array boards 208 may be wireless power signals, wireless data signals, or both.

Control circuit 201 is configured to provide control and intelligence to the array components including the switches 220a-220n, phase shifters 230a-230n, power amplifiers 240a-240n, and antenna arrays 250a-250n. Control circuit 201 may direct and control the various data and power communications. Transmitter 206 can generate a signal comprising power or data communications on a carrier frequency. The signal can be comply with a standardized format such as Bluetooth™, Wi-Fi™, ZigBee™, etc., including combinations or variations thereof. Additionally or alternatively, the signal can be a proprietary format that does not use Bluetooth™, Wi-Fi™, ZigBee™, and the like, and utilizes the same switches 220a-220n, phase shifters 230a-230n, power amplifiers 240a-240n, and antenna arrays 250a-250n to transmit wireless data as are used to transmit wireless power. Such a configuration may save on hardware complexity and conserve power by operating independently of the constraints imposed by compliance with the aforementioned standardized formats. In some embodiments, control circuit 201 can also determine a transmission configuration comprising a directional transmission through the control of the switches 220a-220n, phase shifters 230a-230n, and amplifiers 240a-240n based on an encoded beacon signal received from a WPRC 210.

The external power interface 202 is configured to receive external power and provide the power to various components. In some embodiments, the external power interface 202 may be configured to receive, for example, a standard external 24 Volt power supply. In other embodiments, the external power interface 202 can be, for example, 120/240 Volt AC mains to an embedded DC power supply which may source, for example, 12/24/48 Volt DC to provide the power to various components. Alternatively, the external power interface could be a DC supply which may source, for example, 12/24/48 Volts DC. Alternative configurations including other voltages are also possible.

Switches 220a-220n may be activated to transmit power and/or data and receive encoded beacon signals based on the state of the switches 220a-220n. In one example, switches 220a-220n may be activated, e.g. closed, or deactivated, e.g. open, for power transmission, data transmission, and/or encoded beacon reception. Additional components are also possible. For example, in some embodiments phase-shifters 230a-230n may be included to change the phase of a signal when transmitting power or data to a WPRC 210. Phase shifter 230a-230n may transmit a power or data signal to WPRC 210 based on a phase of a complex conjugate of the encoded beaconing signal from WPRC 210. The phase-shift may also be determined by processing the encoded beaconing signal received from WPRC 210 and identifying WPRC 210. WPTS 200 may then determine a phase-shift associated with WPRC 210 to transmit the power signal. In an example embodiment, data transmitted from the WPTS 200 may be in the form of communication beacons which may be used to synchronize clocks with WPRC 210. This synchronization may improve the reliability of beacon phase detection.

In operation, control circuit 201, which may control the WPTS 200, may receive power from a power source over external power interface 202 and may be activated. Control circuit 201 may identify an available WPRC 210 within range of the WPTS 200 by receiving an encoded beacon signal initiated by the WPRC 210 via at least a portion of antennas 250a-250n. When the WPRC 210 is identified based on the encoded beacon signal, a set of antenna elements on the WPTS may power on, enumerate, and calibrate for wireless power and/or data transmission. At this point, control circuit 201 may also be able to simultaneously receive additional encoded beacon signals from other WPRCs via at least a portion of antennas 250a-250n.

Once the transmission configuration has been generated and instructions have been received from control circuit 201, transmitter 206 may generate and transfer one or more power and/or data signal waves to one or more antenna boards 208. Based on the instruction and generated signals, at least a portion of power switches 220a-220n may be opened or closed and at least a portion of phase shifters 230a-230n may be set to the appropriate phase associated with the transmission configuration. The power and/or data signal may then be amplified by at least a portion of power amplifiers 240a-240n and transmitted at an angle directed toward a location of WPRC 210. As discussed herein, at least a portion of antennas 250a-250n may be simultaneously receiving encoded beacon signals from additional WPRCs 210.

As described above, a WPTS 200 may include one or more antenna array boards 208. In one embodiment, each antenna array board 208 may be configured to communicate with a single WPRC 210, so that a different antenna array board 208 of a plurality of antenna array boards 208 communicates with a different WPRC 210 of a plurality of WPRCs 210. Such an implementation may remove a reliance on a communication method, such as a low-rate personal area network (LR-WPAN), IEEE 802.15.4, or Bluetooth Low Energy (BLE) connection to synchronize with a WPRC 210. A WPTS 200 may receive a same message from a WPRC 210 via different antennas of antennas 250a-250n. The WPTS 200 may use the replication of the same message across the different antennas to establish a more reliable communication link. In such a scenario, a beacon power may be lowered since the lower power can be compensated by the improved reliability owed to the replicated received signals. In some embodiments, it may also be possible to dedicate certain antennas or groups of antennas for data communication and dedicate other antennas or groups of antennas for power delivery. For example, an example WPTS 200 may dedicate 8 or 16 antennas of antennas 250a-250n to data communication at a lower power level than some number of remaining antennas that may be dedicated to power delivery at a relatively higher power level than the data communication.

Figure 3:
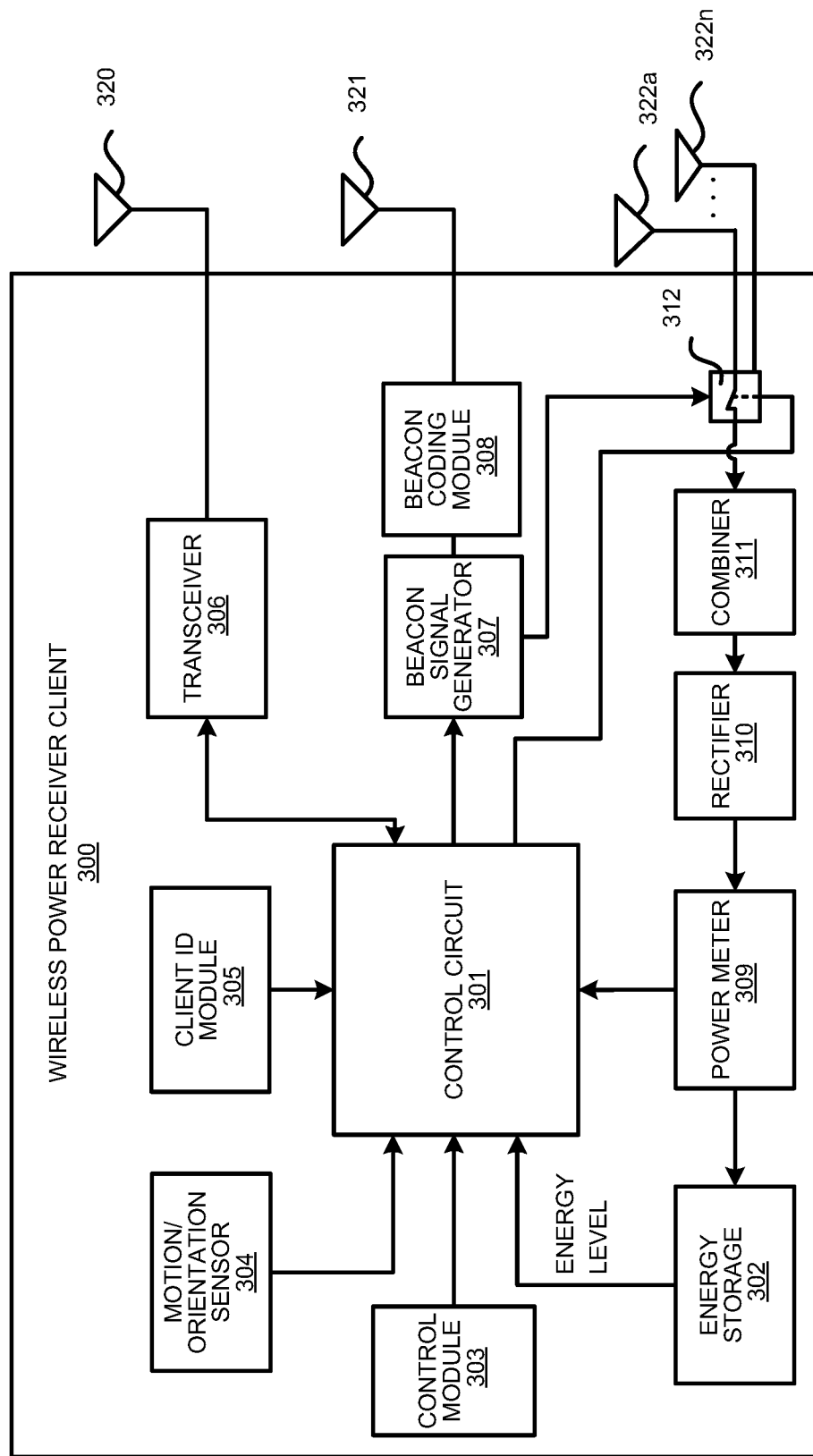
FIG. 3 is a block diagram illustrating an example embodiment of a WPRC.

FIG. 3 is a block diagram illustrating an example WPRC 300 in accordance with embodiments described herein. As shown in the example of FIG. 3, WPRC 300 may include control circuit 301, energy storage 302, a control module 303, for example an Internet of Things (IoT) control module, transceiver 306 and associated one or more antennas 320, power meter 309, rectifier 310, a combiner 311, beacon signal generator 307, beacon coding unit 308 and associated one or more antennas 321, and switch 312 connecting the combiner 311 or the beacon signal generator 307 to one or more associated antennas 322a-322n. The energy storage 302 may be, for example, a batter, a capacitor, or any other suitable energy storage device. Although not depicted, the WPRC 300 may include an energy harvesting circuit which may enable the WPRC 300 to operate with a capacitor for short term energy storage instead of or in addition to using a battery. Some or all of the depicted components in FIG. 3 can be omitted, combined, or sub-divided in some embodiments. Some or all of the components depicted in FIG. 3 may be incorporated in a single integrated chip (IC). It should be noted that although the WPTS 200 may use full-duplexing, WPRC 300 may additionally or alternatively use half-duplexing. A received and/or transmitted data rate may be, for example, 20 Mbps. However, higher or lower data rates may be implemented to achieve other design goals. The WPRC 300 may transmit acknowledgement (ACK) messages back to a WPTS, such as a WPTS 200 depicted in FIG. 2. Although not depicted, a local CPU may be incorporated into WPRC 300. For example, the local CPU may be included in the control circuit 301.

A combiner 311 may receive and combine the received power and/or data transmission signals received via one or more antennas 322a-322n. The combiner can be any combiner or divider circuit that is configured to achieve isolation between output ports while maintaining a matched condition. For example, the combiner 311 can be a Wilkinson Power Divider circuit. The combiner 311 may be used to combine two or more RF signals while maintaining a characteristic impedance, for example, 50 ohms. The combiner 311 may be a resistive-type combiner, which uses resistors, or a hybrid-type combiner, which uses transformers. The rectifier 310 may receive the combined power transmission signal from the combiner 311, if present, which may be fed through the power meter 309 to the energy storage 302 for charging. In other embodiments, each antenna's power path can have its own rectifier 310 and the DC power out of the rectifiers is combined prior to feeding the power meter 309. The power meter 309 may measure the received power signal strength and may provide the control circuit 301 with this measurement.

Energy storage 302 may include protection circuitry and/or monitoring functions. Additionally, the energy storage 302 may include one or more features, including, but not limited to, current limiting, temperature protection, over/under voltage alerts and protection, and capacity monitoring, for example coulomb monitoring. The control circuit 301 may receive the energy level from the energy storage 302 itself. The control circuit 301 may also transmit/receive via the transceiver 306 a data signal on a data carrier frequency, such as the base signal clock for clock synchronization. The beacon signal generator 307 may generate the beacon signal or calibration signal and may transmit the beacon signal or calibration signal using one or more antennas 321.

It may be noted that, although the energy storage 302 is shown as charged by, and providing power to, WPRC 300, the receiver may also receive its power directly from the rectifier 310. This may be in addition to the rectifier 310 providing charging current to the energy storage 302, or in lieu of providing charging. Also, it may be noted that the use of multiple antennas 320, 321, and 322a-322n is one example of implementation, however the structure may be reduced to fewer antennas, such as one shared antenna.

In some embodiments, the control circuit 301 and/or the control module 303 can communicate with and/or otherwise derive device information from WPRC 300. The device information can include, but is not limited to, information about the capabilities of the WPRC 300, usage information of the WPRC 300, power levels of the energy storage 302 of the WPRC 300, and/or information obtained or inferred by the WPRC 300. In some embodiments, a client identifier (ID) module 305 stores a client ID that can uniquely identify the WPRC 300 in a wireless power delivery environment. For example, the ID can be transmitted to one or more WPTSs in the encoded beacon signal. In some embodiments, WPRCs may also be able to receive and identify other WPRCs in a wireless power delivery environment based on the client ID.

A motion/orientation sensor 304 can detect motion and/or orientation and may signal the control circuit 301 to act accordingly. For example, a device receiving power may integrate motion detection mechanisms such as accelerometers or equivalent mechanisms to detect motion. Once the device detects that it is in motion, it may be assumed that it is being handled by a user, and may trigger a signal to the antenna array of the WPTS to either stop transmitting power and/or data, or to initiate wireless power and/or data transmission from the WPTS. The WPRC may use the encoded beacon or other signaling to communicate with the WPTS. In some embodiments, when a WPRC 300 is used in a moving environment like a car, train or plane, the power might only be transmitted intermittently or at a reduced level unless the WPRC 300 is critically low on power.

Additionally or alternatively, a WPRC 300 may include an orientation sensor which may sense a particular orientation of the WPRC 300. An orientation of the WPRC 300 may affect how it receives wireless power from a WPTS. Thus, an orientation may be used to determine a best WPTS with which to pair. Motion/orientation sensor 304 may include only a motion sensor, only an orientation sensor, or may integrate both. Alternatively, two or more separate sensors may be used. Additionally or alternatively, a WPRC 300 may detect a direction of signals received via its antennas from one or more WPTSs to determine its orientation relative to the one or more WPTSs. Thus, in some embodiments, a WPRC 300 may be able to detect a relative orientation without a need for an orientation sensor.

Figure 4:
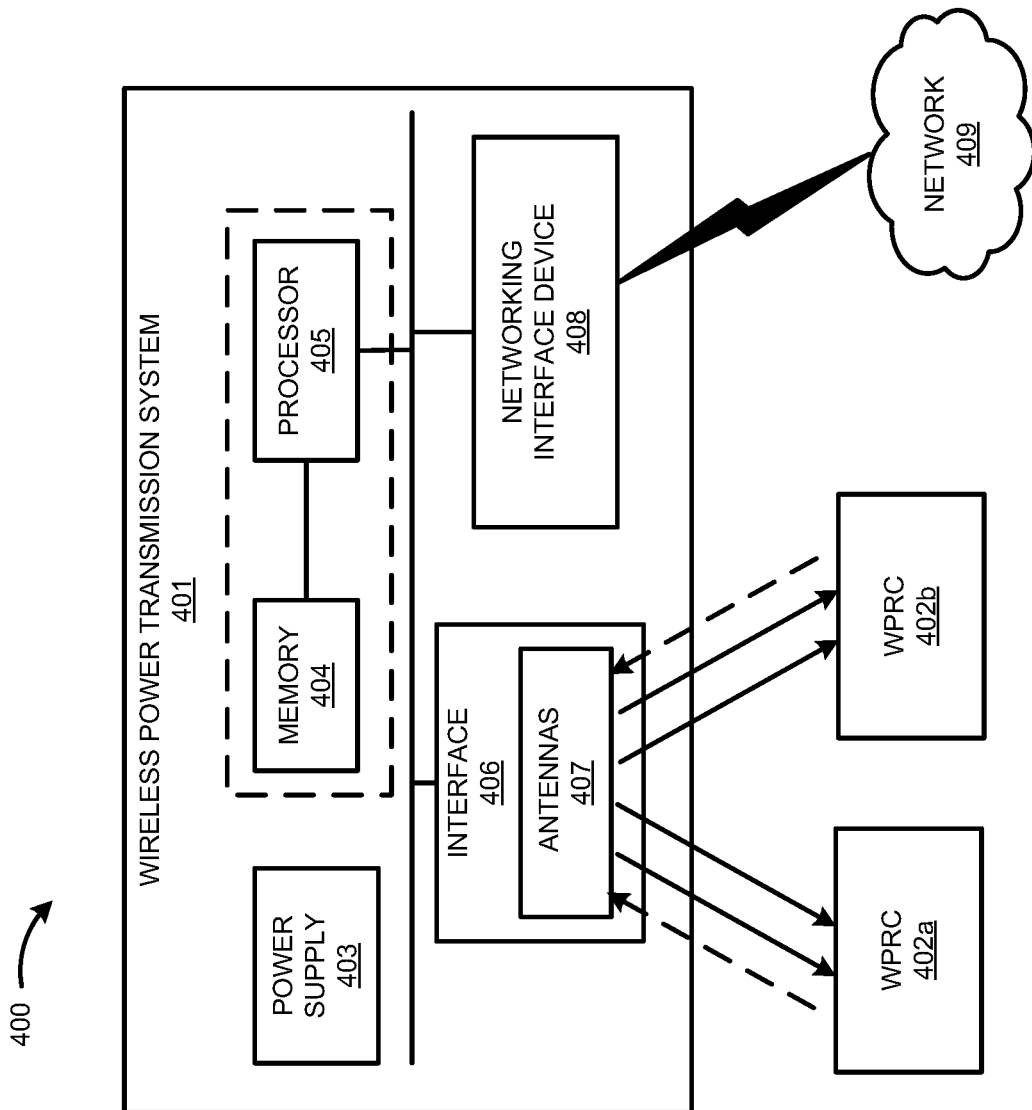
FIG. 4 is a diagram illustrating an example embodiment of a wireless signal delivery environment.

FIG. 4 is a diagram illustrating an example wireless signal delivery environment 400 in accordance with embodiments described herein. The wireless signal delivery environment 400 includes WPTS 401, a user operating WPRCs 402a and 402b, and wireless network 409. Although two WPRCs are depicted in FIG. 4, any number of WPRCs may be supported. WPTS 401 as depicted in FIG. 4 can alternatively be implemented in accordance with WPTS 101 as depicted in FIG. 1. Alternative configurations are also possible. Likewise, WPRCs 402a and 402b as depicted in FIG. 4 can be implemented in accordance with WPRCs 110a-110c of FIG. 1, or can be implemented in accordance with WPRC 300 as depicted in FIG. 3, although alternative configurations are also possible.

WPTS 401 may include a power supply 403, memory 404, processor 405, interface 406, one or more antennas 407, and a networking interface device 408. Some or all of the components of the WPTS 401 can be omitted, combined, or sub-divided in some embodiments. The networking interface device may communicate wired or wirelessly with a network 409 to exchange information that may ultimately be communicated to or from WPRCs 402a and 402b. The one or more antennas 407 may also include one or more receivers, transmitters, and/or transceivers. The one or more antennas 407 may have a radiation and reception pattern directed in a space proximate to WPRC 402a, WPRC 402b, or both, as appropriate. WPTS 401 may transmit a wireless power signal, wireless data signal, or both over at least a portion of antennas 407 to WPRCs 402a and 402b. As discussed herein, WPTS 401 may transmit the wireless power signal, wireless data signal, or both at an angle in the direction of WPRCs 402a and 402b such that the strength of the respectively received wireless signal by WPRCs 402a and 402b depends on the accuracy of the directivity of the corresponding directed transmission beams from at least a portion of antennas 407.

A fundamental property of antennas is that the receiving pattern of an antenna when used for receiving is directly related to the far-field radiation pattern of the antenna when used for transmitting. This is a consequence of the reciprocity theorem in electromagnetics. The radiation pattern can be any number of shapes and strengths depending on the directivity of the beam created by the waveform characteristics and the types of antennas used in the antenna design of the antennas 407. The types of antennas 407 may include, for example, horn antennas, simple vertical antenna, etc. The antenna radiation pattern can comprise any number of different antenna radiation patterns, including various directive patterns, in a wireless signal delivery environment 400. By way of example and not limitation, wireless power transmit characteristics can include phase settings for each antenna and/or transceiver, transmission power settings for each antenna and/or transceiver, or any combination of groups of antennas and transceivers, etc.

As described herein, the WPTS 401 may determine wireless communication transmit characteristics such that, once the antennas and/or transceivers are configured, the multiple antennas and/or transceivers are operable to transmit a wireless power signal and/or wireless data signal that matches the WPRC radiation pattern in the space proximate to the WPRC. Advantageously, as discussed herein, the wireless signal, including a power signal, data signal, or both, may be adjusted to more accurately direct the beam of the wireless signal toward a location of a respective WPRC, such as WPRCs 402a and 402b as depicted in FIG. 4.

The directivity of the radiation pattern shown in the example of FIG. 4 is illustrated for simplicity. It is appreciated that any number of paths can be utilized for transmitting the wireless signal to WPRCs 402a and 402b depending on, among other factors, reflective and absorptive objects in the wireless communication delivery environment. FIG. 4 depicts direct signal paths, however other signal paths, including multi-path signals, that are not direct are also possible.

The positioning and repositioning of WPRCs 402a and 402b in the wireless communication delivery environment may be tracked by WPTS 401 using a three-dimensional angle of incidence of an RF signal at any polarity paired with a distance that may be determined by using an RF signal strength or any other method. As discussed herein, an array of antennas 407 capable of measuring phase may be used to detect a wave-front angle of incidence. A respective angle of direction toward WPRCs 402a and 402b may be determined based on respective distance to WPRCs 402a and 402b and on respective power calculations. Alternatively, or additionally, the respective angle of direction to WPRCs 402a and 402b can be determined from multiple antenna array segments 407.

In some embodiments, the degree of accuracy in determining the respective angle of direction toward WPRCs 402a and 402b may depend on the size and number of antennas 407, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

In one embodiment, a WPRC may be paired with one of a plurality of WPTSs within a localized system of WPRCs and WPTSs. The localized system may be part of a larger system of WPRCs and WPTSs. In some embodiments, the localized system may include a plurality of neighboring WPTSs and one or more WPRCs. In some embodiments, the localized system may include one or more WPRCs and one or more WPTSs within a certain proximity of each other, wherein a change in one or more conditions of the one or more WPRCs and/or one or more WPTSs may have a non-trivial effect on others of the one or more WPRCs and/or one or more WPTS in the localized system.

A pairing is characterized by a pairing quality metric. The pairing quality metric characterizes the performance of the localized system using the current pairing.

At least one alternate pairing quality metric may be generated that characterizes the performance of the localized system for at least one alternate pairing.

A pairing quality metric analyzer (PQMA) may make at least one determination, based on pairing quality metrics, as to which is the better of: a) the current pairing, and b) at least one alternate pairing. The PQMA's determination may cause the current pairing to be ended in favor of initiating the at least one alternate pairing.

The PQMA may need to aggregate pairing quality metric information that may initially be distributed across multiple WPRCs and/or WPTSs.

The PQMA may make at least one additional determination, at a later time, based on an event. The event could include; a change of significant magnitude to the information that was used to make a prior determination, the expiration of a timer, or the completion of at least one other task that was occupying the PQMA. For example, in some embodiments, the change of significant magnitude to the information that was used to make a prior determination may include a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

The determination of a pairing quality metric may be made by a WPRC, a WPTS, or another device such as a computing server with a data connection to a WPRC or WPTS. In some embodiments, a WPTS, a WPRC, or another device may be a PQMA or may include a PQMA. The determination may require the aggregation of information that is initially distributed amongst various WPRCs and/or WPTSs. To aggregate information, WPRCs and WPTSs may communicate by some means. In one embodiment, the communication may occur by using wireless networking.

The information that is aggregated to make a determination may include WPRC position and orientation information, WPTS position and orientation information, information about the power needs of the WPRC, information about power delivery capabilities of the WPTS, information about how WPTSs are currently paired with WPRCs, and information about the power needs of the WPRCs.

Updated position information and orientation information of the WPRC may be determined by a WPTS based on a beacon transmitted by the WPRC or may be provided to the WPTS by the WPRC based on one or more positional and orientation sensors.

In one embodiment, in order to optimize WPTS-WPRC pairings, the WPTS paired with the WPRC may share the updated position information and orientation information of the WPRC with one or more neighboring WPTSs in a localized system. One or more PQMAs may reside in the one or more neighboring WPTSs of the localized system. The one or more PQMAs may use the updated position information and orientation information of the WPRC to calculate a predicted power delivery to the WPRC for each respective WPTS. The respective predicted power deliver values may be shared and/or aggregated among the one or more PQMAs. In one embodiment, the paired WPTS and the one or more neighboring WPTSs may share respective predicted power delivery values with each other. At least one of the one or more PQMAs may choose the WPTS-WPRC pairing with the highest predicted power delivery for the WPRC.

On a condition that the paired WPTS has the greatest predicted power delivery, the paired WPTS may remain paired with the WPRC and will directionally transmit wireless power to the WPRC using the updated position information and orientation information. In some embodiments, wireless power may be directionally transmitted to a WPRC may include targeting a specific WPRC and transmitting wireless power to a targeted area proximate to the WPRC. On a condition that one of the one or more neighboring WPTSs has the greatest predicted power delivery, the PQMA may communicate with the paired WPTS and the one or more neighboring WPTSs to indicate that the WPRC should be paired with the one neighboring WPTS. The neighboring WPTS may then directionally transmit wireless power to the WPRC using the updated position information and orientation information.

In this way, one or more PQMAs may optimize WPTS-WPRC pairings. The one or more PQMAs may maintain updated position information and orientation information of WPRCs and WPTSs and evaluate which WPTS should provide wireless power to a WPRC. Pairings may be adjusted such that no WPRC would be significantly better served by being paired with a different WPTS.

As referenced above, a predicted power of a WPTS may not only be based on updated position information and orientation information of the WPRC, but may additionally or alternatively be based on updated position information and orientation information of the WPTS itself. For example, a WPTS may be mounted to a movable structure such as a car door, where the door being opened or closed changes the position and orientation of the WPTS and its associated ability to deliver wireless power to a WPRC.

A predicted power of a WPTS may not only be based on updated position information and orientation information of the WPRC or WPTS, but may also be based on an ability to service a load associated with all WPRCs paired with the WPTS. For example, a WPTS may be limited by how much power it can wirelessly deliver to a WPRC due to a load demand placed on the WPTS by other WPRCs already paired with the WPTS. Thus, in one example scenario, a heavily loaded WPTS may not be able to deliver optimal wireless power to the WPRC that the WPTS would otherwise be able to deliver if not for the large power load it is already responsible for wirelessly delivering. In another example scenario, the pairing quality metric analyzer may offload one or more of the WPRCs that are paired with the heavily loaded WPTS to other WPTSs so that the WPTS may be able to provide more power to the WPRC so that an overall better optimized set of WPTS-WPRC pairings in a localized system may be established.

As described above, a change in a WPRC's or WPTS's position or orientation may cause a PQMA to reevaluate how much power a WPTS can wirelessly deliver to the WPRC and whether the WPRC would be better paired with a neighboring WPTS. Additionally or alternatively, changing load demands on different WPTSs may cause a PQMA to reevaluate whether a WPRC would be better paired with a neighboring WPTS. In another example, a change in the environment may additionally or alternatively cause a PQMA to evaluate a WPTS's pairings with WPRCs. For example, a person may move between the WPTS and its paired WPRC and impair the WPTS's ability to wirelessly deliver power to the WPRC. In this example, it may be optimal for the WPRC to be paired with a neighboring WPTS where the person is not between the neighboring WPTS and the WPRC.

Thus, it follows from the example embodiments described above, that an example system is envisioned wherein one or more PQMAs may maintain updated information on the respective abilities of WPTSs to provide wireless power to its paired WPRCs. A PQMA in the example system may evaluate a WPTS's pairings based on the updated pairing quality metrics to ensure that no WPRC would be significantly better served being paired with a different WPTS. Thus, a system configured in accordance with the description herein would evolve towards an Epsilon Equilibrium.

FIGS. 5A-5D depict example scenarios of two candidate WPTSs, WPTS 1 and WPTS 2, serving a WPRC A, where an orientation of WPRC A may affect which WPTS would optimally serve WPRC A. A PQMA may be included in WPTS 1 and/or WPTS 2, in WPRC A, and/or in another entity not depicted such as a cloud server. Additionally or alternatively, WPTS 1, WPTS 2, WPRC A, and/or another entity not depicted and their associated components may be configured to act as a PQMA.

Figure 5A:
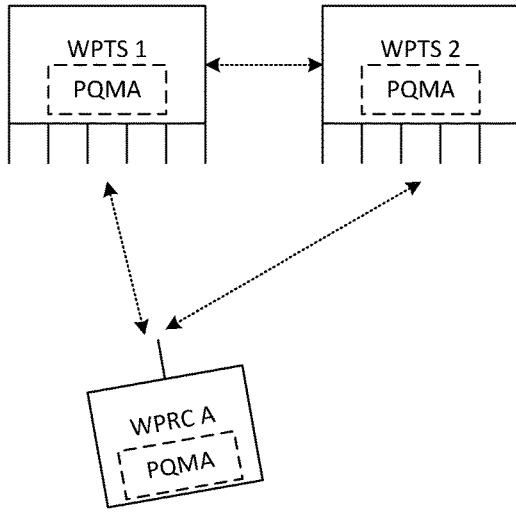
FIGS. 5A-5D depict example scenarios of a system including two WPTSs and a WPRC.

FIG. 5A, depicts WPRC A transmitting a wireless beacon signal. The wireless beacon signal may be omnidirectional or directional. The WPRC A may also transmit updated position information and orientation information. In one embodiment, WPRC A may transmit updated position information to WPTS 1 only, and WPTS 1 may share the updated position information with WPTS 2. Additionally or alternatively, a WPTS may determine updated position information and orientation information from characteristics of the beacon signal. It may be assumed that WPRC A is paired with WPTS 1 through previously executed procedures. A PQMA may determine that the pairing of WPTS 1 with WPRC A may be reevaluated. As described above, the PQMA may be located in any of WPTS 1, WPTS 2, WPRC A, or another entity not depicted. The PQMA may reevaluate the pairing based on detecting a triggering event has occurred. The triggering event may include any triggering event as described above, for example, a change in orientation of WPRC A. As depicted, in one embodiment, WPTS 1, WPTS 2, and WPRC A may share updated position information and orientation information. The PQMA may aggregate information about the system of localized WPTSs and WPRCs to determine an optimal pairing. The PQMA is not limited to be located in any one particular entity. Rather, depending on the location of the PQMA, information may be appropriately aggregated via signaling between the entities. The PQMA may determine a predicted performance of the localized system for WPTS 1 paired with WPRC A and alternatively for WPTS 2 paired with WPRC A. As previously described, the PQMA may analyze information such as position and orientation information of WPTS 1, WPTS 2, and WPRC A, load demands on WPTS 1 and WPTS 2, and other environmental factors to determine performance of the localized system for WPRC A paired with WPTS 1 and for WPRC A paired with WPTS 2.

Figure 5B:
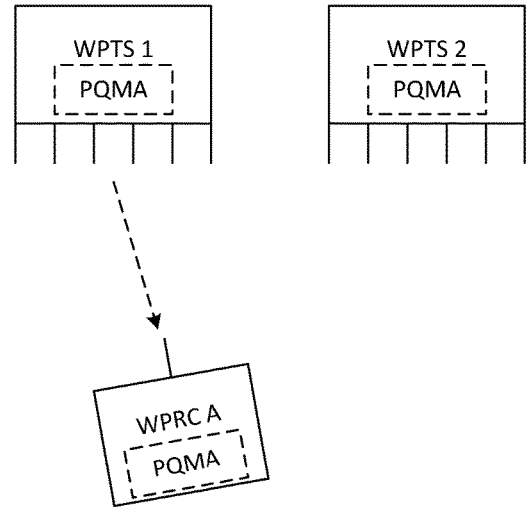

FIG. 5B depicts WPTS 1 transmitting wireless power to WPRC A. In this scenario, the PQMA may have determined that the localized system is optimized with WPTS 1 paired with WPRC A rather than WPTS 2 based on corresponding pairing quality metrics. Thus, WPTS 1 remains paired with WPRC A and is responsible for wirelessly delivering power to WPRC A. It may be noted that WPRC A is depicted with an antenna that is oriented towards WPTS 1. By way of example, because the antenna of WPRC A is oriented towards WPTS 1 and away from WPTS 2, WPTS 1 may be able to deliver more wireless power to WPRC A. Thus, as depicted in FIG. 5B, WPTS 1 wirelessly delivers power to WPRC A.

Figure 5C:
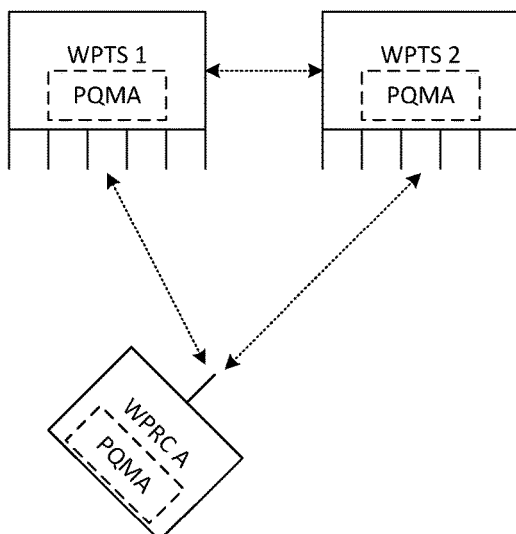

FIG. 5C depicts WPRC A transmitting another wireless beacon signal. As depicted in FIG. 5C, WPRC A may have changed orientation from that depicted in FIG. 5A and FIG. 5B. WPRC A may also transmit updated position information and orientation information. In one embodiment, WPRC A may transmit updated position information to WPTS 1 only, and WPTS 1 may share the updated position information with WPTS 2. A PQMA may detect that, for example, the orientation of WPRC A has changed and that the pairing of WPTS 1 with WPRC A may be reevaluated. As depicted, in one embodiment, WPTS 1, WPTS 2, and WPRC A may share updated position information and orientation information. The PQMA may aggregate information about the system of localized WPTSs and WPRCs to determine an optimal pairing. The PQMA may determine a predicted performance of the localized system for WPTS 1 paired with WPRC A and alternatively for WPTS 2 paired with WPRC A. As previously described, the PQMA may analyze information such as position and orientation information of WPTS 1, WPTS 2, and WPRC A, load demands on WPTS 1 and WPTS 2, and other environmental factors to determine performance of the localized system for WPRC A paired with WPTS 1 and for WPRC A paired with WPTS 2.

Figure 5D:
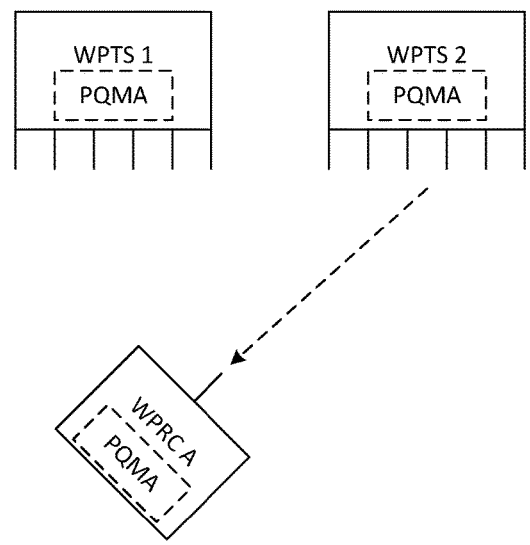

FIG. 5D depicts WPTS 2 transmitting wireless power to WPRC A. In this scenario, the PQMA may have determined that the localized system is optimized with WPTS 2 paired with WPRC A rather than WPTS 1 based on corresponding pairing quality metrics. Thus, the PQMA updates the localized system such that WPRC A is paired with WPTS 2 and WPTS 2 is now responsible for wirelessly delivering power to WPRC A. As depicted in FIG. 5D, the orientation of WPRC A has changed from that depicted in FIG. 5A and FIG. 5B. In FIG. 5D, the antenna of WPRC A is oriented towards WPTS 2. By way of example, because the antenna of WPRC A is oriented towards WPTS 2 and away from WPTS 1, WPTS 2 may be able to deliver more wireless power to WPRC A. Thus, as depicted in FIG. 5D, WPTS 2 wirelessly delivers power to WPRC A.

FIGS. 6A-6D depict more example scenarios of two candidate WPTSs, WPTS 1 and WPTS 2, serving a WPRC A, where a position of WPRC A may affect which WPTS would optimally serve WPRC A. A PQMA may be included in WPTS 1 and/or WPTS 2, in WPRC A, and/or in another entity not depicted such as a cloud server. Additionally or alternatively, WPTS 1, WPTS 2, WPRC A, and/or another entity not depicted and their associated components may be configured to act as a PQMA.

Figure 6A:
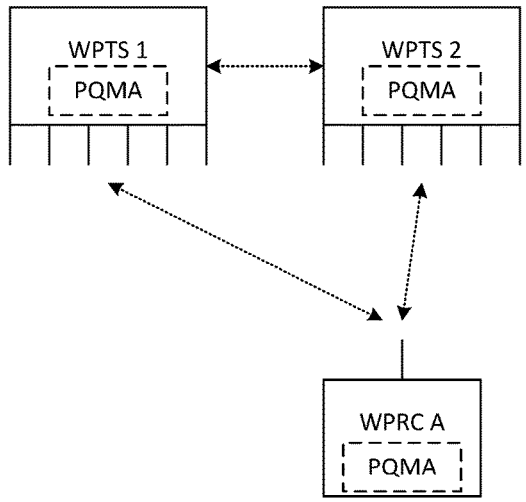
FIGS. 6A-6D depict more example scenarios of a system including two WPTSs and a WPRC.

FIG. 6A depicts WPRC A transmitting a wireless beacon signal. As previously mentioned, the wireless beacon signal may be omnidirectional or directional. The WPRC A may also transmit updated position information and orientation information. In one embodiment, WPRC A may transmit updated position information to WPTS 2 only, and WPTS 2 may share the updated position information with WPTS 1. Additionally or alternatively, a WPTS may determine updated position information and orientation information from characteristics of the beacon signal. It may be assumed that WPRC A is paired with WPTS 2 through previously executed procedures. A PQMA may determine that the pairing of WPTS 2 with WPRC A may be reevaluated. As described above, the PQMA may be located in any of WPTS 1, WPTS 2, WPRC A, or another entity not depicted. The PQMA may reevaluate the pairing based on detecting a triggering event has occurred. The triggering event may include any triggering event as described above, for example, a change in location of WPRC A. As depicted, in one embodiment, WPTS 1, WPTS 2, and WPRC A may share updated position information and orientation information. The PQMA may aggregate information about the system of localized WPTSs and WPRCs to determine an optimal pairing. The PQMA is not limited to be located in any one particular entity. Rather, depending on the location of the PQMA, information may be appropriately aggregated via signaling between the entities. The PQMA may determine a predicted performance of the localized system for WPTS 2 paired with WPRC A and alternatively for WPTS 1 paired with WPRC A. As previously described, the PQMA may analyze information such as position and orientation information of WPTS 1, WPTS 2, and WPRC A, load demands on WPTS 1 and WPTS 2, and other environmental factors to determine performance of the localized system for WPRC A paired with WPTS 1 and for WPRC A paired with WPTS 2.

Figure 6B:
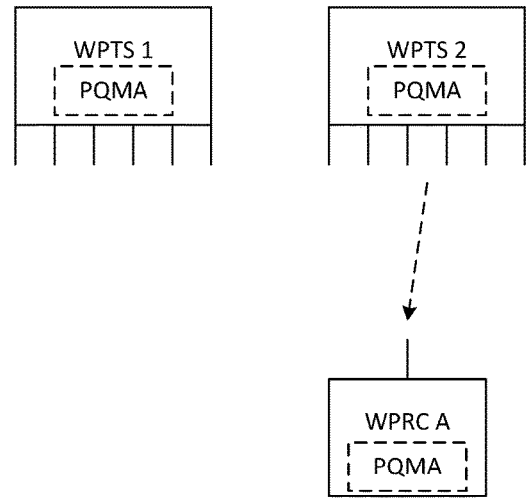

FIG. 6B depicts WPTS 2 transmitting wireless power to WPRC A. In this scenario, the PQMA may have determined that the localized system is optimized with WPTS 2 paired with WPRC A rather than WPTS 1 based on corresponding pairing quality metrics. Thus, WPTS 2 remains paired with WPRC A and is responsible for wirelessly delivering power to WPRC A. It may be noted that WPRC A is depicted located at a position that is relatively closer to WPTS 2 than to WPTS 1. By way of example, because WPRC A is located closer to WPTS 2 than to WPTS 1, WPTS 2 may be able to deliver more wireless power to WPRC A. Thus, as depicted in FIG. 6B, WPTS 2 wirelessly delivers power to WPRC A.

Figure 6C:
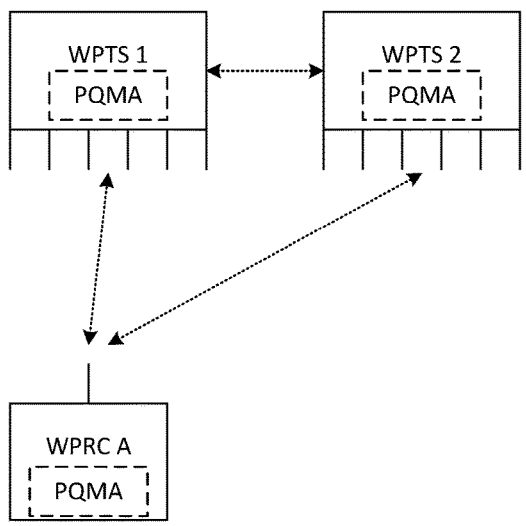

FIG. 6C depicts WPRC A transmitting another wireless beacon signal. As depicted in FIG. 6C, WPRC A may have changed position from that depicted in FIG. 6A and FIG. 6B.

WPRC A may also transmit updated position information and orientation information. In one embodiment, WPRC A may transmit updated position information to WPTS 1 only, and WPTS 1 may share the updated position information with WPTS 2. A PQMA, which may reside in any of WPTS 1, WPTS 2, WPRC A, or another entity not depicted may detect that, for example, the position of WPRC A has changed and that the pairing of WPTS 2 with WPRC A may be reevaluated. As depicted, in one embodiment, WPTS 1, WPTS 2, and WPRC A may share updated position information and orientation information. The PQMA may aggregate information about the system of localized WPTSs and WPRCs to determine an optimal pairing. The PQMA may determine a predicted performance of the localized system for WPTS 2 paired with WPRC A and alternatively for WPTS 1 paired with WPRC A. As previously described, the PQMA may analyze information such as position and orientation information of WPTS 1, WPTS 2, and WPRC A, load demands on WPTS 1 and WPTS 2, and other environmental factors to determine performance of the localized system for WPRC A paired with WPTS 1 and for WPRC A paired with WPTS 2.

Figure 6D:
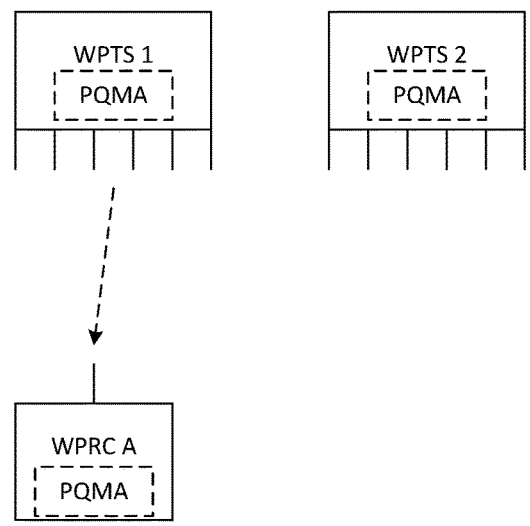

FIG. 6D depicts WPTS 1 transmitting wireless power to WPRC A. In this scenario, the PQMA may have determined that the localized system is optimized with WPTS 1 paired with WPRC A rather than WPTS 2 based on corresponding pairing quality metrics. Thus, the PQMA updates the localized system such that WPRC A is paired with WPTS 1 and WPTS 1 is now responsible for wirelessly delivering power to WPRC A. As depicted in FIG. 6D, the position of WPRC A has changed from that depicted in FIG. 6A and FIG. 6B. In FIG. 6D, WPRC A is positioned closer to WPTS 1. By way of example, because WPRC A is positioned closer to WPTS 1 than to WPTS2, WPTS 1 may be able to deliver more wireless power to WPRC A. Thus, as depicted in FIG. 6D, WPTS 1 wirelessly delivers power to WPRC A.

FIGS. 7A-7D depict more example scenarios of two candidate WPTSs, WPTS 1 and WPTS 2, serving a WPRC A, where an environmental change may affect which WPTS would optimally serve WPRC A. A PQMA may be included in WPTS 1 and/or WPTS 2, in WPRC A, and/or in another entity not depicted such as a cloud server. Additionally or alternatively, WPTS 1, WPTS 2, WPRC A, and/or another entity not depicted and their associated components may be configured to act as a PQMA.

Figure 7A:
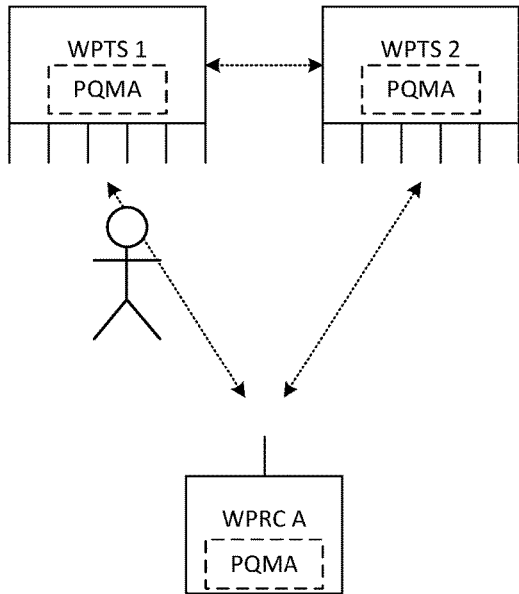
FIGS. 7A-7D depict more example scenarios of a system including two WPTSs and a WPRC.

FIG. 7A depicts WPRC A transmitting a wireless beacon signal. As previously mentioned, the wireless beacon signal may be omnidirectional or directional. The WPRC A may also transmit updated position information and orientation information. In one embodiment, WPRC A may transmit updated position information to WPTS 2 only, and WPTS 2 may share the updated position information with WPTS 1. Additionally or alternatively, a WPTS may determine updated position information, orientation information, and environmental information from characteristics of the beacon signal. For example, as depicted in FIG. 7A, WPTS 2 may determine a location of a person based on characteristics of the received beacon from WPRC A. It may be assumed that WPRC A is paired with WPTS 2 through previously executed procedures. A PQMA may determine that the pairing of WPTS 2 with WPRC A may be reevaluated. As described above, the PQMA may be located in any of WPTS 1, WPTS 2, WPRC A, or another entity not depicted. The PQMA may reevaluate the pairing based on detecting a triggering event has occurred. The triggering event may include any triggering event as described above, for example, a change in environmental conditions such as a position of a person relative to a wireless signal path established between WPTS 2 and WPRC A. As depicted, in one embodiment, WPTS 1, WPTS 2, and WPRC A may share updated position information, orientation information, and environmental information. The PQMA may aggregate information about the system of localized WPTSs and WPRCs to determine an optimal pairing. The PQMA is not limited to be located in any one particular entity. Rather, depending on the location of the PQMA, information may be appropriately aggregated via signaling between the entities. The PQMA may determine a predicted performance of the localized system for WPTS 2 paired with WPRC A and alternatively for WPTS 1 paired with WPRC A. As previously described, the PQMA may analyze information such as position and orientation information of WPTS 1, WPTS 2, and WPRC A, load demands on WPTS 1 and WPTS 2, and other environmental factors to determine performance of the localized system for WPRC A paired with WPTS 1 and for WPRC A paired with WPTS 2.

WPTS 1 and WPTS 2 may be configured to each receive the beacon from WPRC A such that each can independently or collaboratively determine position information, orientation information, and environmental information associated with WPRC A. For example, WPTS 1 may determine, based on the received beacon, that the person is in a line-of-sight path between WPTS 1 and WPRC A. WPTS 2 may determine, based on the received beacon, that the person is favorably positioned away from a line-of-sight path between WPTS2 and WPRC A. Additionally or alternatively, each of WPTS 1 and WPTS 2 may transmit a trial wireless power transmission to WPRC A. In some embodiments, transmitting a trial wireless power transmission may include WPTS 1 pairing with WPRC A. WPTS 1 may receive a beacon from WPRC A. WPTS 1 may transmit power back to WPRC A based on the beacon. WPRC A may measure the power that is received from WPTS 1 to determine an amount of the power received from WPTS 1 and may provide power measurement information to a PQMA based on the measurement. A similar process may be executed by WPTS 2 and WPRC A. In some embodiments, WPTS 2 may receive the beacon from WPRC A. Additionally or alternatively, WPTS 2 may receive a new beacon from WPRC A. WPTS 2 may transmit power back to WPRC A based on the received beacon. WPRC A may measure the power that is received from WPTS 2 to determine an amount of the power received from WPTS 2 and may provide power measurement information to the PQMA based on the measurement. Based on a comparison of transmitted power by WPTS 1 and WPTS 2 versus the provided power measurement information, the PQMA may determine which WPTS is more optimal to provide wireless power to WPRC A.

Figure 7B:
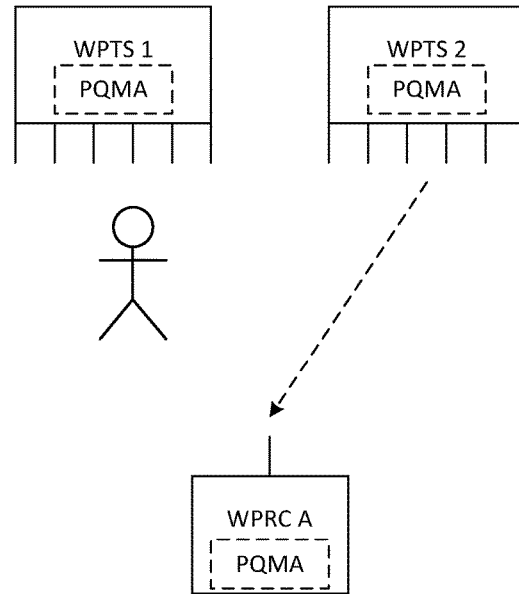

FIG. 7B depicts WPTS 2 transmitting wireless power to WPRC A. In this scenario, the PQMA may have determined that the localized system is optimized with WPTS 2 paired with WPRC A rather than WPTS 1 based on corresponding pairing quality metrics. Thus, WPTS 2 remains paired with WPRC A and is responsible for wirelessly delivering power to WPRC A. By way of example, because the person is depicted as being positioned between WPTS 1 and WPRC A and the person is not positioned between WPTS 2 and WPRC A, WPTS 2 may be able to deliver more wireless power to WPRC A. Thus, as depicted in FIG. 7B, WPTS 2 wirelessly delivers power to WPRC A.

Figure 7C:
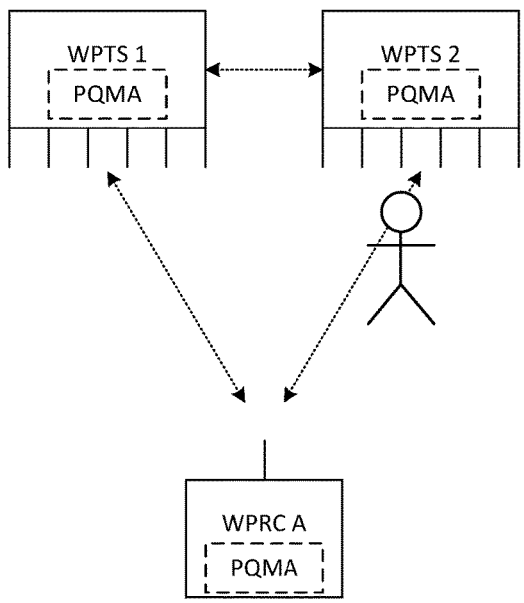

FIG. 7C depicts WPRC A transmitting another wireless beacon signal. As depicted in FIG. 7C, the person may have changed position from that depicted in FIG. 7A and FIG. 7B. WPRC A may also transmit updated position information and orientation information. Additionally or alternatively, a WPTS may determine updated position information, orientation information, and environmental information from characteristics of the beacon signal. For example, as depicted in FIG. 7C, WPTS 2 may determine a person has moved between WPTS 2 and WPRC A based on characteristics of the received beacon from WPRC A. As depicted, WPTS 1, WPTS 2, and WPRC A may share updated position information, orientation information, environmental information or factors, and trial power measurement information with WPTS 1. The PQMA may aggregate information about the system of localized WPTSs and WPRCs to determine an optimal pairing. The PQMA may determine a predicted performance of the localized system for WPTS 2 paired with WPRC A and alternatively for WPTS 1 paired with WPRC A. As previously described, the PQMA may analyze information such as position and orientation information of WPTS 1, WPTS 2, and WPRC A, load demands on WPTS 1 and WPTS 2, and other environmental factors to determine performance of the localized system for WPRC A paired with WPTS 1 and for WPRC A paired with WPTS 2. As also described above, the PQMA may determine a predicted wireless power delivery from WPTS 1 and WPTS 2 to WPRC A based on analysis of the received beacon, and additionally or alternatively based on a comparison of an amount of trial wireless power transmitted to an amount of wireless power received by WPRC A.

Figure 7D:
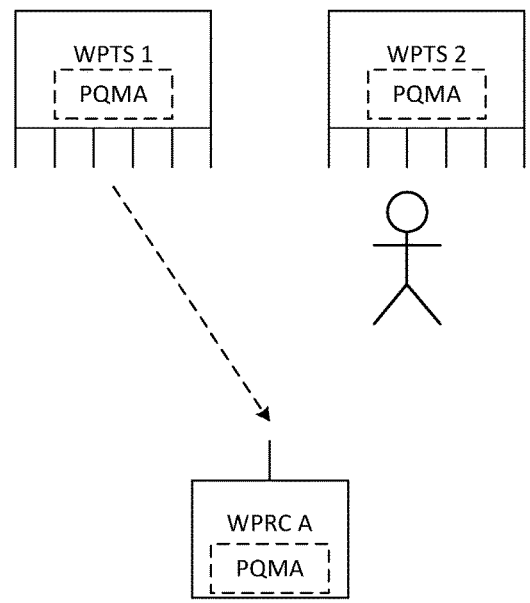

FIG. 7D depicts WPTS 2 transmitting wireless power to WPRC A. In this scenario, the PQMA may have determined that the localized system is optimized with WPTS 1 paired with WPRC A rather than WPTS 2 based on corresponding pairing quality metrics. Thus, the PQMA updates the localized system such that WPRC A is paired with WPTS 1 and WPTS 1 is now responsible for wirelessly delivering power to WPRC A. As depicted in FIG. 7D, the person changed position from that depicted in FIG. 7A and FIG. 7B. In FIG. 7D, the person is now positioned between WPTS 2 and WPRC A. By way of example, because the person is depicted as being positioned between WPTS 2 and WPRC A and the person is not positioned between WPTS 1 and WPRC A, WPTS 1 may be able to deliver more wireless power to WPRC A Thus, as depicted in FIG. 7D, WPTS 1 wirelessly delivers power to WPRC A.

Although FIGS. 5A-5D, 6A-6D, and 7A-7D depict two WPTSs and one WPRC, any number of WPTSs and WPRCs may be included in a localized system. Further, although a PQMA is depicted in all of WPTS 1, WPTS 2, and WPRC A, a PQMA may not be included in all and thus may only be included in a subset. As previously described, a PQMA may be included in another entity, such as a server, not depicted. In some embodiments, a PQMA may not be included in WPTS 1, WPTS 2, and WPRC A. Additionally or alternatively, as also set forth above, a WPTS, a WPRC, or another entity and their associated components may be configured to act as a PQMA.

A WPRC may pair with a WPTS by transmitting an indication of an identification of the WPRC to the WPTS. In turn, the WPTS may transmit an indication of an identification of the WPTS to the WPRC. In some embodiments, the WPTS may transmit an acknowledgement of the pairing to the WPRC. The acknowledgement may be separate from the WPTS identification or the WPTS identification may be an implicit acknowledgement of the pairing.

A WPTS may share power transfer rate information with another WPTS, with a WPRC, or with another entity such as a server. Power transfer rate information may include, for example, an average power, a real-time power, and/or a peak power that may be transmitted to a particular WPRC. The WPTS may also share a percentage of time that the WPTS may be able to transmit power to the WPRC. In this way, a WPTS may, for example, send an indication of a load demand on the WPTS. The WPTS may also measure an amount of power that may be transmitted to the WPRC. The WPRC may share received power capabilities with a WPTS. For example, the WPRC may share an average and/or peak power receiving capability of the WPRC. The WPRC may also share a needed total power and/or a needed power rate to be received. The WPRC may also transmit an indication of how much time the WPRC may remain charged before running out of power. The WPRC may also measure a received power from the WPTS and may share an indication of the amount of measured, received power from the WPTS.

A WPRC may determine orientation information with respect to one or more WPTSs using an antenna array of the WPRC. For example, the WPRC may include a 3×3 antenna array, and may determine from which direction a transmission from a WPTS is received. In some embodiments, the WPRC may determine from which direction the WPTS transmission is received by analyzing a phase and/or signal strength of one or more signals received at each antenna element of the antenna array. The determined direction may be used to determine the orientation of the WPRC relative to the WPTS.

In another embodiment, in addition to a PQMA evaluating a current pairing and at least one alternate pairing for a localized system, a PQMA may receive a proposed pairing for the localized system. The proposed pairing may be received from another PQMA, which may reside in a WPTS, a WPRC, or another entity such as a server. The PQMA may evaluate the proposed pairing for the localized system and may accept or reject the proposed pairing. The PQMA may additionally or alternatively modify the proposed pairing and may send back the modified, proposed pairing for approval.

Description of the above embodiments includes sharing updated information. In one embodiment, the updated information may be transmitted as a delta from a last known state. Thus, updated information may be transmitted in a more efficient manner wherein only changes in information may be transmitted.

Figure 8:
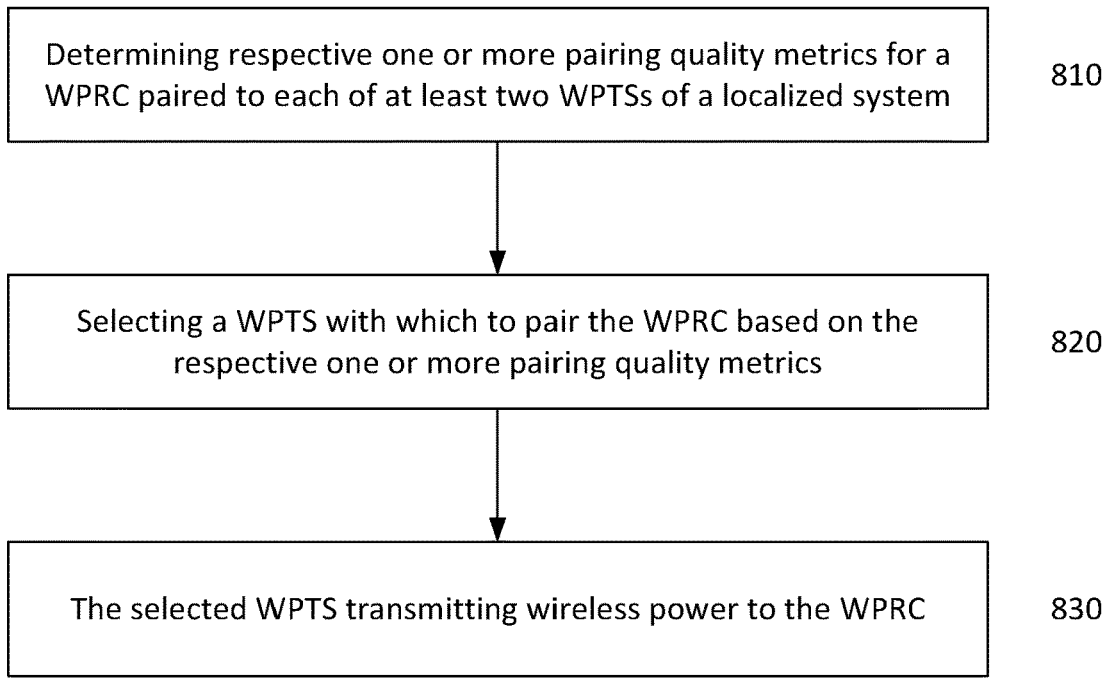
FIG. 8 is a flow diagram depicting an example method that may be performed by a WPRC, a WPTS, or another entity such as a server.

FIG. 8 is a flow diagram depicting an example method 800 that may be performed by a WPRC, a WPTS, or another entity such as a server. A PQMA may be included in any of the WPRC, WPTS, or another entity or the WPRC, WPTS, or another entity and their respective components may be configured to perform method 800. Step 810 includes determining respective one or more pairing quality metrics for a WPRC paired to each of at least two WPTSs of a localized system. A pairing quality metric may indicate a relative performance of the localized system if it were to operate with an associated WPTS-WPRC pairing. As described above, a pairing quality metric may be based on a location and orientation of a WPRC, a location and orientation of any WPTSs in the localized system, a load demand on any of the WPTSs of the localized system, environmental conditions, etc. Step 820 includes selecting a WPTS with which to pair the WPRC based on the respective one or more pairing quality metrics. If the selected WPTS is not the same as the WPTS currently paired to the WPRC, the WPTS may communicate with the currently paired WPTS and the WPRC so that the WPRC updates its pairing to the selected WPTS. Step 820 includes the selected WPTS transmitting wireless power to the WPRC.

Figure 9:
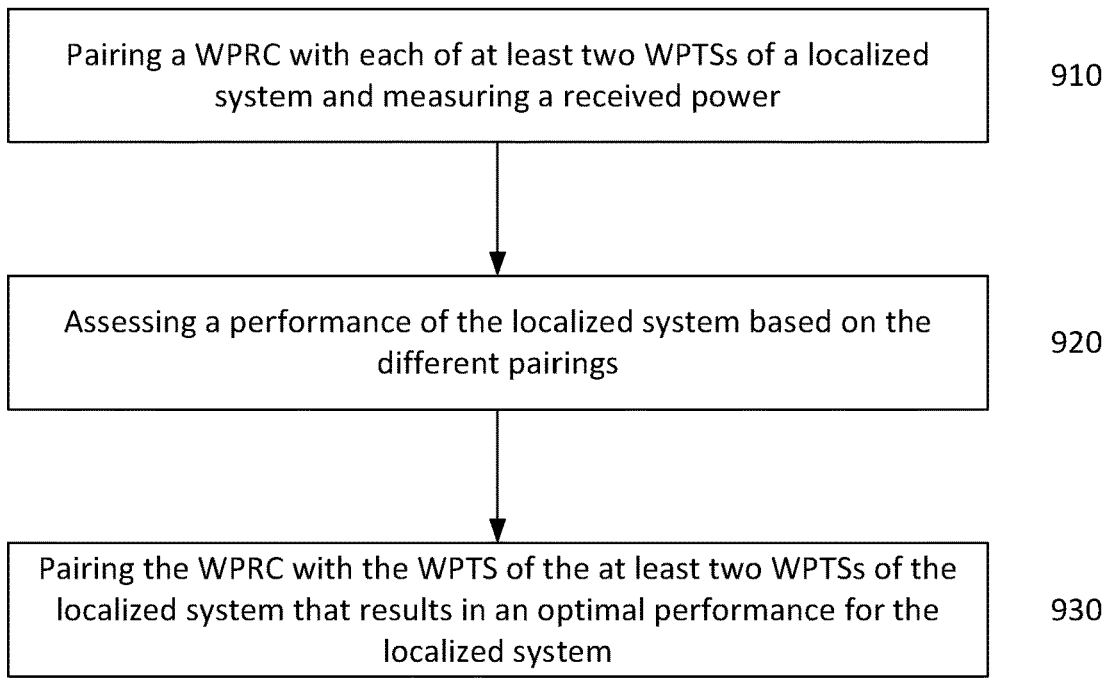
FIG. 9 is a flow diagram depicting an example method that may be performed by a WPRC, a WPTS, or another entity such as a server.

FIG. 9 is a flow diagram depicting an example method 900 that may be performed by a WPRC, a WPTS, or another entity such as a server. A PQMA may be included in any of the WPRC, WPTS, or another entity or the WPRC, WPTS, or another entity and their respective components may be configured to perform method 900. Step 910 includes pairing a WPRC with each WPTS of at least two WPTSs of a localized system and measuring a power received by the WPRC. Step 920 includes assessing a performance of the localized system based on the different pairings. Step 930 includes pairing the WPRC with the WPTS of the at least two WPTSs of the localized system that results in an optimal performance for the localized system. In the event the selected WPRC-WPTS pairing that results in an optimal performance for the localized system is the same as a current pairing, the WPRC-WPTS pairing may be maintained.

Figure 10:
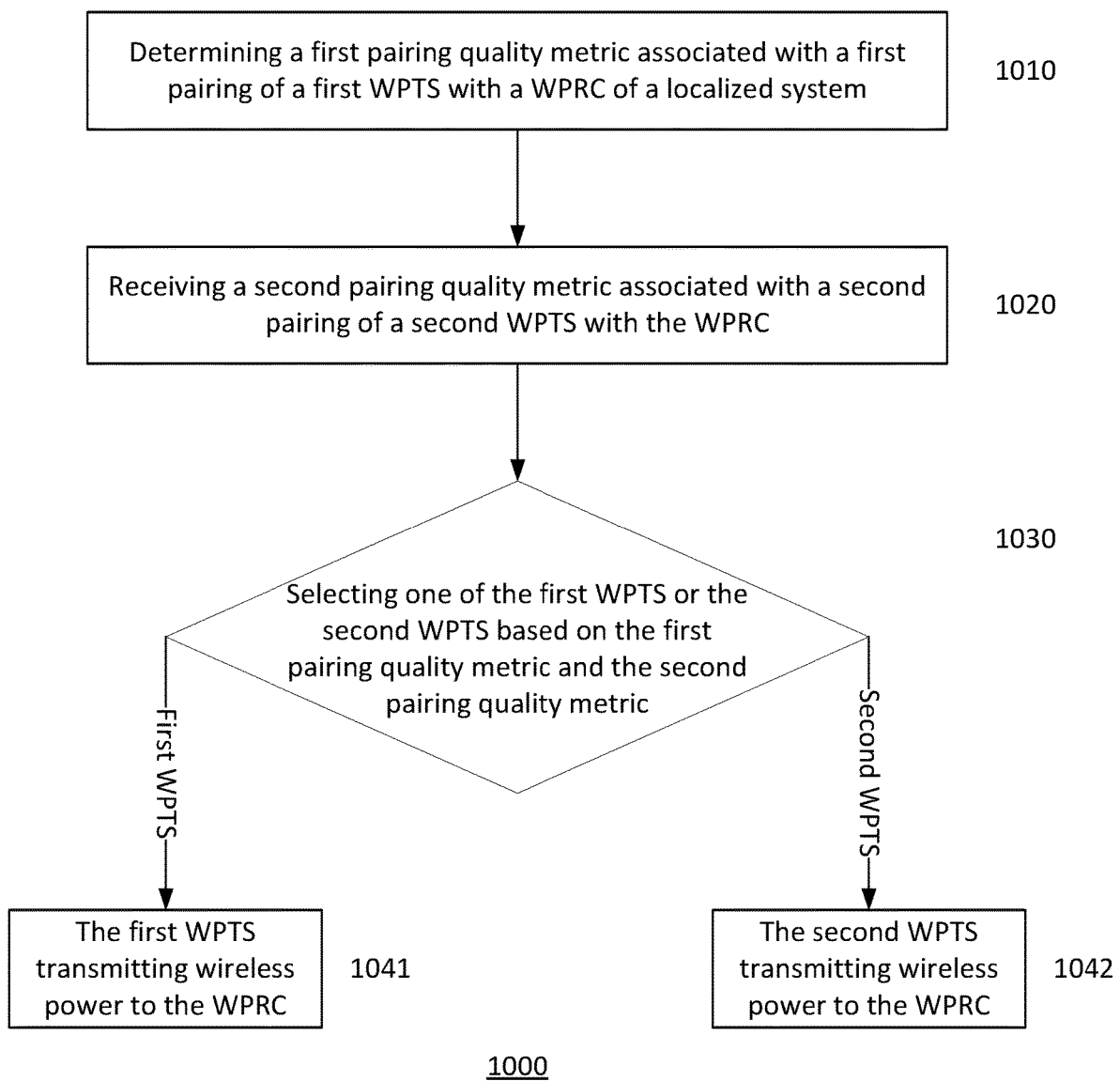
FIG. 10 is a flow diagram depicting an example method that may be performed by a WPTS.

FIG. 10 is a flow diagram depicting an example method 1000 that may be performed by a WPTS. A PQMA may be included in the WPTS or the WPTS and its respective components may be configured to perform method 1000. Step 1010 includes determining a first pairing quality metric associated with a first pairing of a first WPTS with a WPRC of a localized system. Step 1020 includes receiving a second pairing quality metric associated with a second pairing of a second WPTS with the WPRC. Step 1030 includes selecting one of the first WPTS or the second WPTS based on the first pairing quality metric and the second pairing quality metric. If the first WPTS is selected, at 1041, the first WPTS transmits wireless power to the WPRC. If the second WPTS is selected, at 1042, the second WPTS transmits wireless power to the WPRC.

Figure 11:
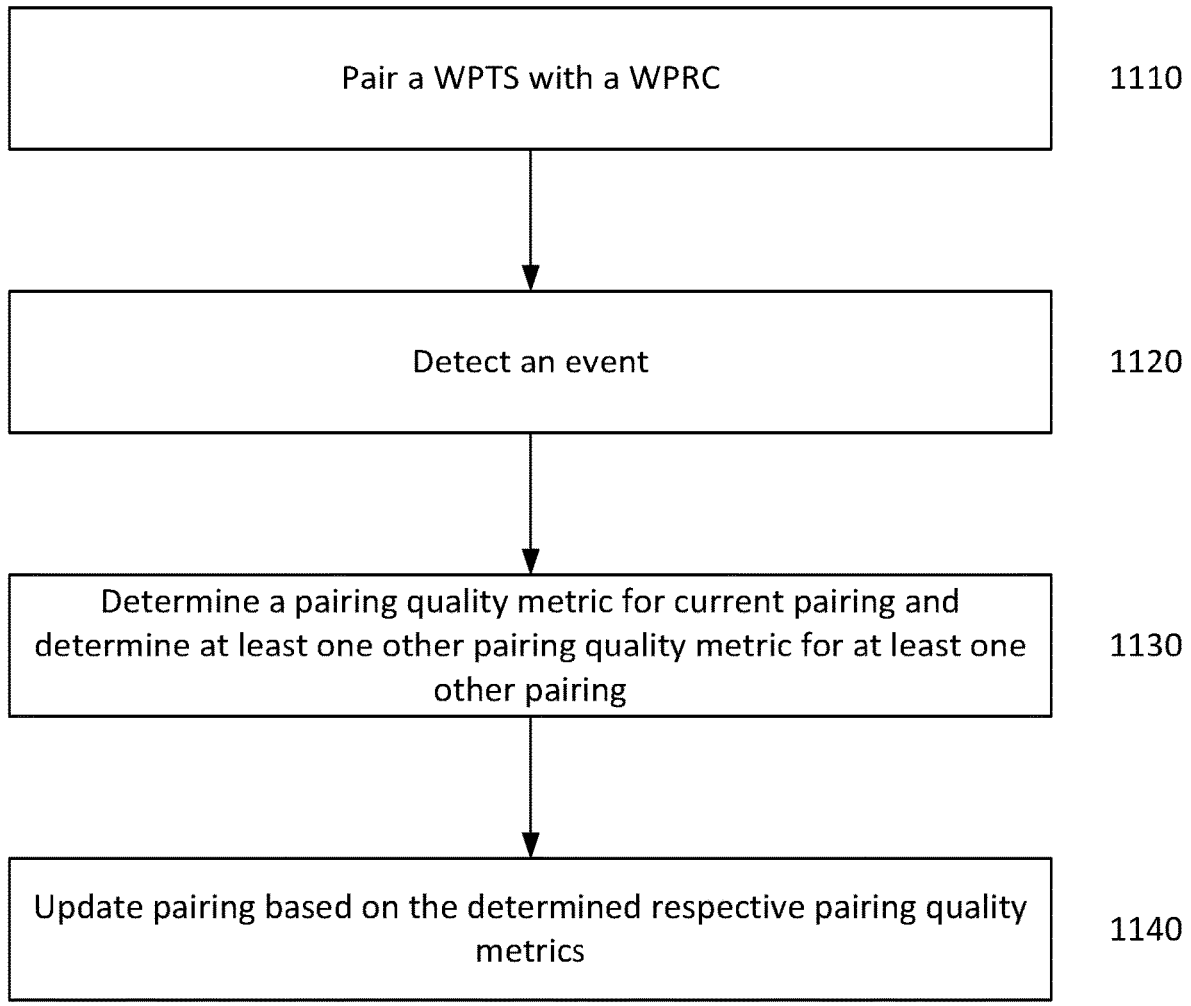
FIG. 11 is a flow diagram depicting an example method that may be performed by a WPRC, a WPTS, or another entity such as a server.

FIG. 11 is a flow diagram depicting an example method 1100 that may be performed by a WPRC, a WPTS, or another entity such as a server. A PQMA may be included in any of the WPRC, WPTS, or another entity or the WPRC, WPTS, or another entity and their respective components may be configured to perform method 1100. Step 1110 includes pairing a WPTS with a WPRC. The WPTS-WPRC pairing may be optimal at the time of pairing, wherein the particular WPTS is best suited to provide wireless power to the WPRC. Step 1120 includes detecting an event. As described above, an event may include a detection that information upon which the WPTS was selected to be paired with the WPRC has become stale. For example, stale information may be a result of a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, a change in a power need of at least one other WPRC of the localized system, or a timer may have expired to trigger a reassessment of the pairing. Step 1130 includes determining a pairing quality metric for the current pairing and also determining a pairing quality metric for at least one other pairing. Step 1140 includes updating the pairing based on the determined respective pairing quality metrics. As described above, a pairing quality metric may indicate a performance of a localized system of WPTSs and WPRCs when an associated WPTS-WPRC pairing is executed. In step 1140, it is preferable that the pairing associated with the most optimal pairing quality metric is selected.

It should be noted that the example methods and particular order of steps depicted in FIGS. 8-11 are not meant to be limiting. The steps as depicted in FIGS. 8-11 may be rearranged, combined, omitted, sub-divided, or otherwise modified and still fall within the scope of the embodiments described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a WPTS or WPRC.

What is claimed is:

1. A method performed by a wireless power transmission system (WPTS), the method comprising:
transmitting, to a wireless power receiver client (WPRC), an indication for the WPRC to pair with the WPTS, wherein the indication is based on a first pairing quality metric associated with a first pairing with the WPTS of a localized system and at least a second pairing quality metric associated with a second pairing with a different WPTS of the localized system, wherein the first pairing quality metric is favorable over the second pairing quality metric; and
transmitting wireless power to the WPRC based on the indication.

2. The method of claim 1, wherein the first pairing quality metric is based on a power need of the WPRC.

3. The method of claim 1, wherein the first pairing quality metric is based on position information of the WPRC.

4. The method of claim 3, wherein the first pairing quality metric is based on orientation information of the WPRC.

5. The method of claim 1, wherein the first pairing quality metric is based on position and orientation information of the WPTS.

6. The method of claim 1, wherein the first pairing quality metric is based on information indicating how WPTSs of the localized system are paired with WPRCs.

7. The method of claim 1, further comprising transmitting an updated indication on a condition that an event has occurred.

8. The method of claim 7, wherein the event includes a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

9. The method of claim 1, further comprising:
transmitting a first trial power transmission to the WPRC; and
receiving a first trial power indication indicating a first amount of the first trial power transmission received by the WPRC;
wherein the indication for the WPRC to pair with the WPTS is based on the first trial power indication.

10. The method of claim 1, wherein the first pairing quality metric is based on an amount of transmission power transmitted by the WPTS and an amount of transmission power received by the WPRC.

11. A wireless power transmission system (WPTS) comprising:
a processor and at least one transmitter, the processor and at least one transmitter configured to:
transmit, to a wireless power receiver client (WPRC), an indication for the WPRC to pair with the WPTS, wherein the indication is based on a first pairing quality metric associated with a first pairing with the WPTS of a localized system and at least a second pairing quality metric associated with a second pairing with a different WPTS of the localized system, wherein the first pairing quality metric is favorable over the second pairing quality metric; and
transmit wireless power to the WPRC based on the indication.

12. The WPTS of claim 11, wherein the first pairing quality metric is based on a power need of the WPRC.

13. The WPTS of claim 11, wherein the first pairing quality metric is based on position information of the WPRC.

14. The WPTS of claim 13, wherein the first pairing quality metric is based on orientation information of the WPRC.

15. The WPTS of claim 11, wherein the first pairing quality metric is based on position and orientation information of the WPTS.

16. The WPTS of claim 11, wherein the first pairing quality metric is based on information indicating how WPTSs of the localized system are paired with WPRCs.

17. The WPTS of claim 11, wherein the processor and at least one transmitter are further configured to transmit an updated indication on a condition that an event has occurred.

18. The WPTS of claim 17, wherein the event includes a change in position of the WPRC, a change in orientation of the WPRC, a change in position of any WPTS of the localized system, a change in orientation of any WPTS of the localized system, a change in a power need of the WPRC, a change in power delivering capability of any WPTS of the localized system, a change in how WPTSs of the localized system are paired with WPRCs, or a change in a power need of at least one other WPRC of the localized system.

19. The WPTS of claim 11, further comprising a receiver, wherein:
the processor and at least one transmitter are further configured to transmit a first trial power transmission to the WPRC; and
the receiver is configured to receive a first trial power indication indicating a first amount of the first trial power transmission received by the WPRC;
wherein the indication for the WPRC to pair with the WPTS is based on the first trial power indication.

20. The WPTS of claim 11, wherein the first pairing quality metric is based on an amount of transmission power transmitted by the WPTS and an amount of transmission power received by the WPRC.

* * * * *